United States Patent
Scales

(10) Patent No.: US 9,648,960 B2
(45) Date of Patent: May 16, 2017

(54) SLIPCOVER FOR FURNITURE

(71) Applicant: Crystal Scales, Oak Ridge, NC (US)

(72) Inventor: Crystal Scales, Oak Ridge, NC (US)

(73) Assignee: Crystal Scales, Oak Ridge, NC (US)

( * ) Notice: Subject to any disclaimer, the term of this patent is extended or adjusted under 35 U.S.C. 154(b) by 38 days.

(21) Appl. No.: 14/822,040

(22) Filed: Aug. 10, 2015

(65) Prior Publication Data

US 2017/0042341 A1    Feb. 16, 2017

(51) Int. Cl.
*A47C 31/11*    (2006.01)
*B60N 2/60*    (2006.01)
*B60N 2/58*    (2006.01)

(52) U.S. Cl.
CPC ............ *A47C 31/11* (2013.01); *B60N 2/5858* (2013.01); *B60N 2/6063* (2013.01)

(58) Field of Classification Search
CPC ..... A47C 31/11; B60N 2/5858; B60N 2/6063
USPC ............. 297/224, 225, 228, 228.11; 150/158
See application file for complete search history.

(56) References Cited

U.S. PATENT DOCUMENTS

| | | | | |
|---|---|---|---|---|
| 1,695,244 A | * | 12/1928 | Cohen | A47C 31/11 297/225 |
| 1,820,104 A | * | 8/1931 | Whaley | A47C 31/11 297/224 |
| 1,970,820 A | * | 8/1934 | Scheellkopf | B60N 2/6063 297/224 |
| 2,100,868 A | | 11/1937 | Oppenheimer, Jr. | |
| 2,183,828 A | * | 12/1939 | Trubitz | A47C 31/11 112/414 |
| 2,469,520 A | | 5/1949 | Roberts, Jr. | |
| 2,528,313 A | * | 10/1950 | Kessler | A47G 9/0246 5/497 |
| 2,619,156 A | * | 11/1952 | Seaman | B60N 2/60 297/228.11 |
| 2,667,211 A | * | 1/1954 | Krasnov | A47C 31/11 297/224 |
| 2,757,718 A | | 8/1956 | Lenz | |
| 2,793,683 A | * | 5/1957 | Trubitt | A47C 31/11 297/224 |
| 2,800,169 A | | 7/1957 | Armbrecht | |
| 2,820,510 A | | 1/1958 | Sugarman | |
| 2,884,993 A | | 5/1959 | Schutte | |
| 2,942,280 A | * | 6/1960 | May, Jr. | A47G 9/0246 5/497 |
| 3,273,175 A | * | 9/1966 | Anderson | A47G 9/0246 5/497 |
| 3,338,630 A | * | 8/1967 | Dudley | B60N 2/6027 297/228.11 |
| 3,589,770 A | * | 6/1971 | Kelley | A47C 31/11 297/218.5 |

(Continued)

*Primary Examiner* — Robert Canfield
(74) *Attorney, Agent, or Firm* — Womble Carlyle Sandridge & Rice, LLP

(57) ABSTRACT

Presented slipcovers have a tight fitting cover for a pleasing appearance by aesthetically and strategically incorporating stretchable material, for example elastic, to one or more seams of the slipcover. The result is a cover that maintains the desired finished appearance with an improved ability to be slid on and off of an underlying seat. The slipcovers of the present disclosure are applied without additional forms of attachment directly to the seat and without additions or connections to, or around any external sections of the slipcovers.

3 Claims, 9 Drawing Sheets

(56) References Cited

U.S. PATENT DOCUMENTS

| | | | |
|---|---|---|---|
| 4,682,555 A * | 7/1987 | Bierbaum | A47G 9/0246 112/104 |
| 4,958,886 A * | 9/1990 | Barattini | B60N 2/58 297/224 |
| 5,005,901 A * | 4/1991 | Hinde | B60N 2/6036 297/220 |
| 5,265,933 A * | 11/1993 | Croshaw | B60N 2/6063 297/228.1 |
| 5,510,167 A * | 4/1996 | Candolfi | A47C 31/11 150/158 |
| 5,549,355 A | 8/1996 | Illulian | |
| 5,694,866 A * | 12/1997 | Muller | A47C 7/66 108/161 |
| 5,809,593 A * | 9/1998 | Edwards | A47G 9/0246 40/299.01 |
| 7,695,066 B2 * | 4/2010 | Guercia | A47C 31/11 297/219.1 |
| 7,857,384 B2 | 12/2010 | Miller | |
| 2002/0088054 A1 * | 7/2002 | McCain | A47C 31/105 5/500 |
| 2002/0185898 A1 * | 12/2002 | Smith | A47C 31/11 297/224 |
| 2003/0137170 A1 * | 7/2003 | Riley | A47C 31/11 297/228 |
| 2005/0046249 A1 * | 3/2005 | Crumley | B62J 1/20 297/218.4 |
| 2007/0114823 A1 * | 5/2007 | Miller | A47C 31/11 297/225 |
| 2007/0176474 A1 * | 8/2007 | Miller | A47C 31/11 297/224 |
| 2008/0252119 A1 * | 10/2008 | Miller | A47C 31/11 297/224 |
| 2009/0140563 A1 * | 6/2009 | Placide | B60N 2/6063 297/224 |
| 2011/0049951 A1 * | 3/2011 | Bettencourt | A47C 31/11 297/229 |

\* cited by examiner

SLIPCOVER FOR FURNITURE

FIELD OF DISCLOSURE

The present disclosure relates to removable slipcovers for seating.

BACKGROUND AND SUMMARY

With many years of patented furniture slipcovers before us, this invention has managed to create the one that all other covers have 'skirted' around. While it is appreciated that that many slipcovers have had many similar features, such as coverings for the arms, seat, rear of seat, and the back of the chair, as well as the use of fabric and material, a difference of the present invention is strategically where fabric and material are being used. In the majority of coverings, fabric is defined as material, but all material is not fabric. This invention aesthetically and strategically places material allowing the fabric to have the proper performance, all the while, serving the look of a slipcover with a custom-tailored fit for kid's and children's furniture covers without any external ties or notions to maintain the desired finished appearance with an improved ability to be slid on and off of an underlying seat.

Slipcovers of the present disclosure provide a tight fitting cover for a pleasing appearance by strategically adding elasticity to one or more designated portions of the slipcover, resulting in a slipcover that maintains the desired finished appearance with an improved ability to be slid on and off of an underlying seat. The slipcovers of the present disclosure may be installed without additional forms of attachment directly to the seat and without the additional steps of connecting separate sections of the slipcovers.

Generally, the present disclosure describes a slipcover for furniture, such as toddler or children's furniture, that is easily replaceable but provides a fitted appearance when installed over the furniture. Even more so than full-size furniture, furniture sized for children is even more likely to become soiled or in need of a style change as the furniture is more often used or is passed from one sibling to the next. The slipcover includes a plurality of fabric panels, the fabric panels are sewn together to form a plurality of seams between adjacent panels and a continuous bottom hem. At least one length of elastic material is added along the continuous bottom hem, or at least one of the seams, to allow the slipcover to more easily fit over a predetermined furniture piece. The slipcover fits over the furniture and provides a favorable final appearance without having pleats, without being fastened directly to the furniture, and without separate attachment between the fabric panels beyond the sewn seams.

In other embodiments, the present disclosure also describes slipcovers formed from a set of fabric panels that either comprise, or alternatively exclusively consist of, a backrest panel, a seat panel, a pair of armrest panels, a pair of front panels; a pair of skirt panels, and a rear panel. The slipcover may also include a first elastic material along an entire bottom hem of the combined pair of skirt panels to provide stretch as the slipcover is installed on, and removed from, the furniture.

These and other aspects of the present invention will become apparent and understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

As used herein, the term "exterior" means the visible surfaces of the slipcover when fitted over a chair as intended. Counter to the "exterior," the "interior" of the slipcover as used herein describes the surfaces of the slipcover that generally face inward toward the chair when the slipcover is in-use. The "interior" of the slipcover would be generally visible if the slipcover were applied inside-out over the chair, or if the slipcover was viewed before being fitted over as chair. The present disclosure often describes embodiments of the disclosed slipcover as disposed or fitted over a chair. The present invention, however, is not limited to slipcovers for single person chairs, but may also be used with multi-person seating type furniture pieces, such as sofas, couches, loveseats, etc. In some embodiments, the slipcovers of the present disclosure are specifically sized and dimensioned to be used with furniture pieces that are proportional to toddlers or children. Scaled down children's furniture may be defined as having each dimension of less than sixty-three inches. In other embodiments, the slipcovers of the present disclosure may be sized and dimensioned to fit over full-sized furniture pieces.

Figure 1:
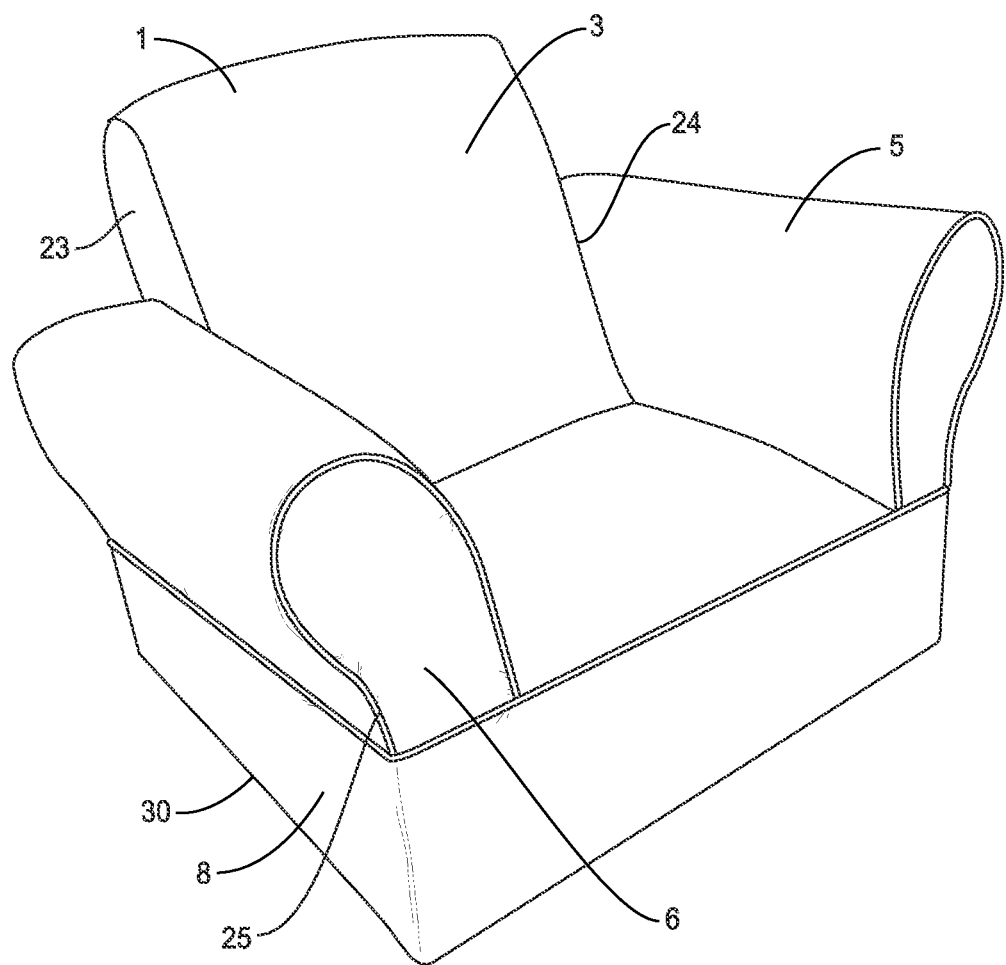
FIG. 1 is an exterior perspective view of a slipcover positioned over a chair according to embodiments of the present disclosure.
Figure 2:
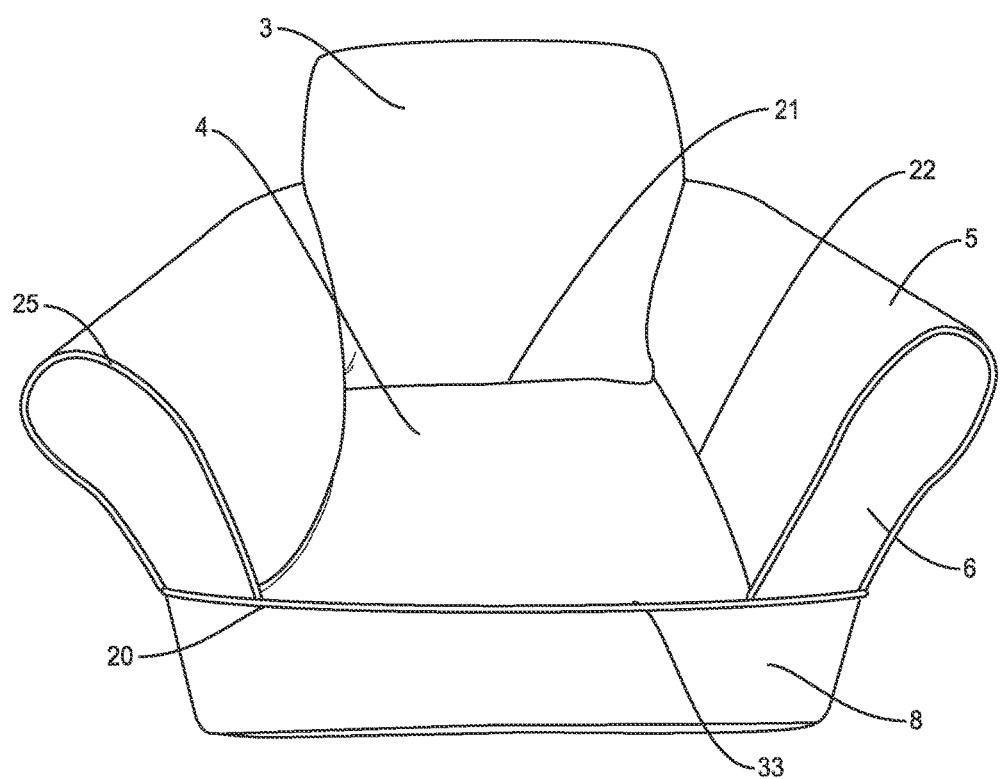
FIG. 2 is an exterior front view of a slipcover positioned over a chair according to embodiments of the present disclosure.
Figure 3:
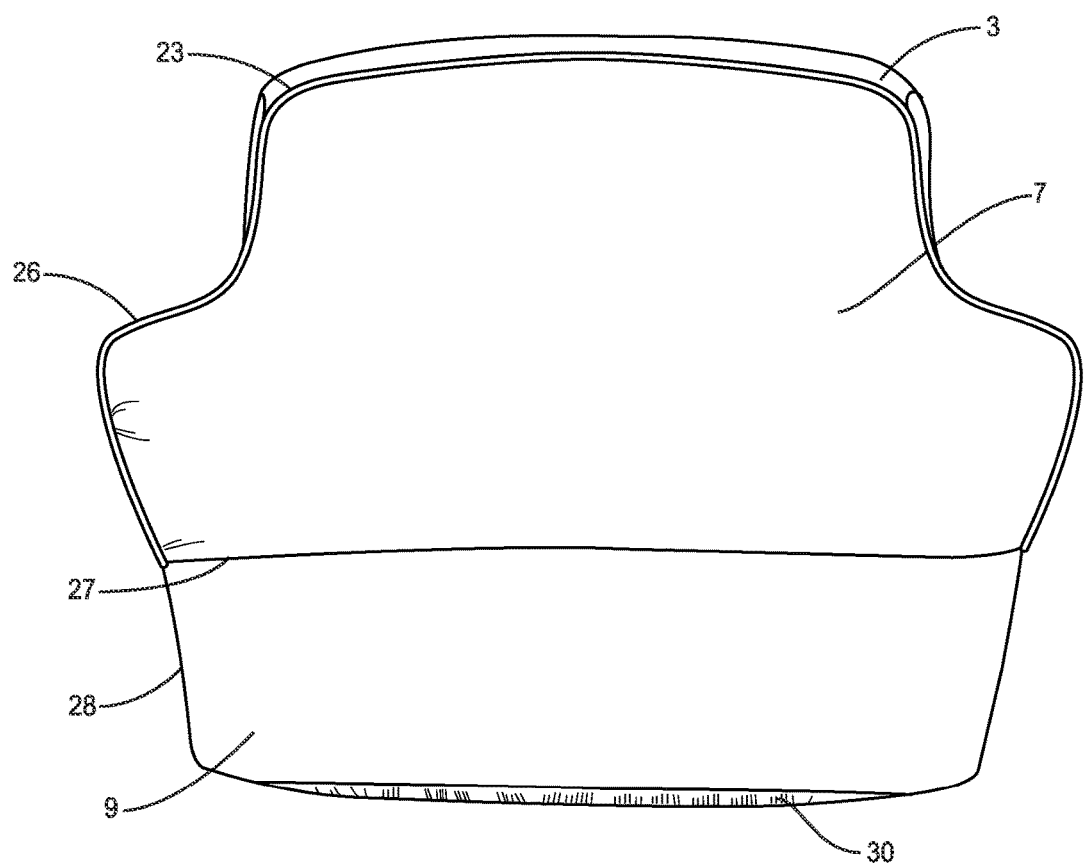
FIG. 3 is an exterior rear view of a slipcover positioned over a chair according to embodiments of the present disclosure.
Figure 4:
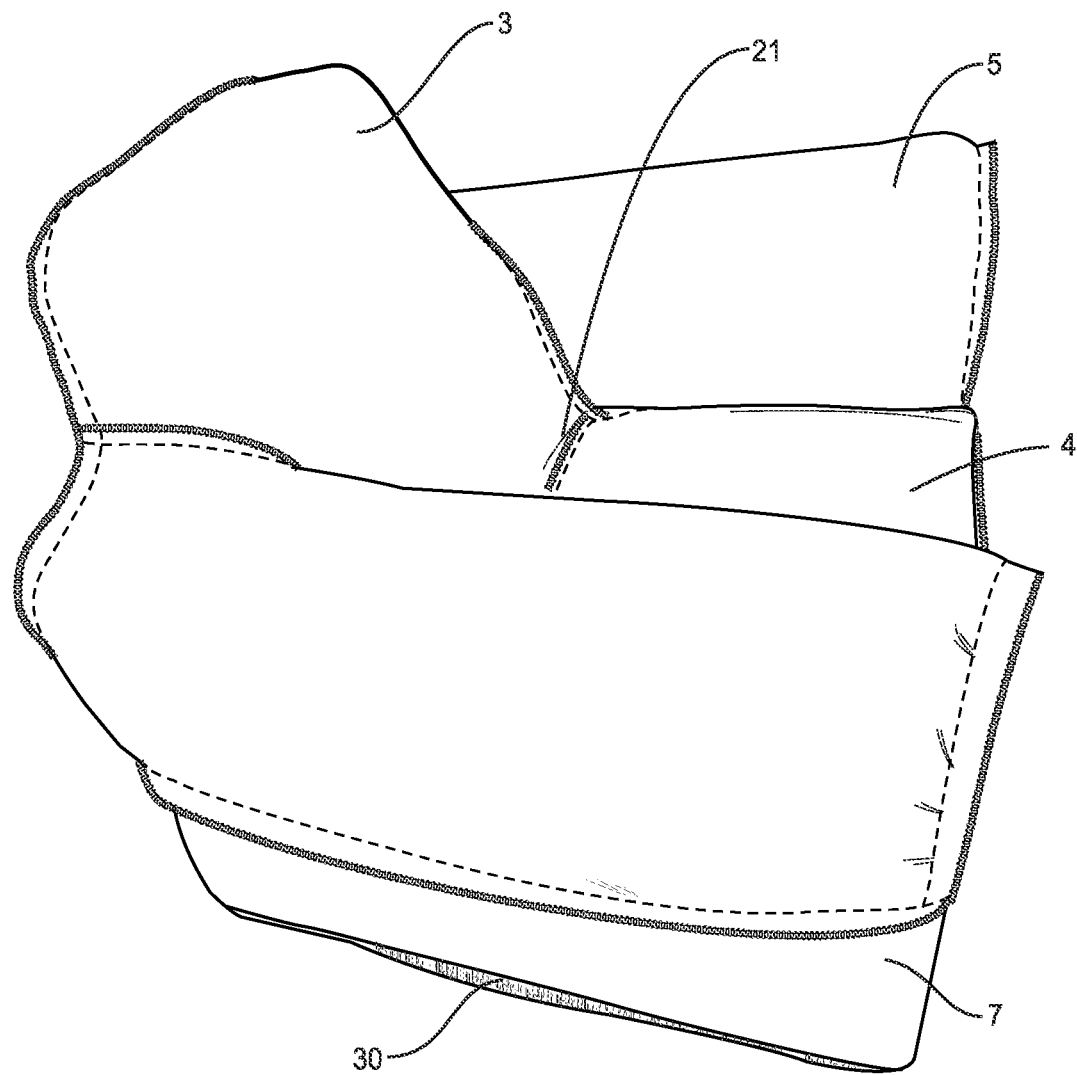
FIG. 4 is a perspective view of a slipcover positioned inside-out over a chair according to embodiments of the present disclosure.
Figure 5:
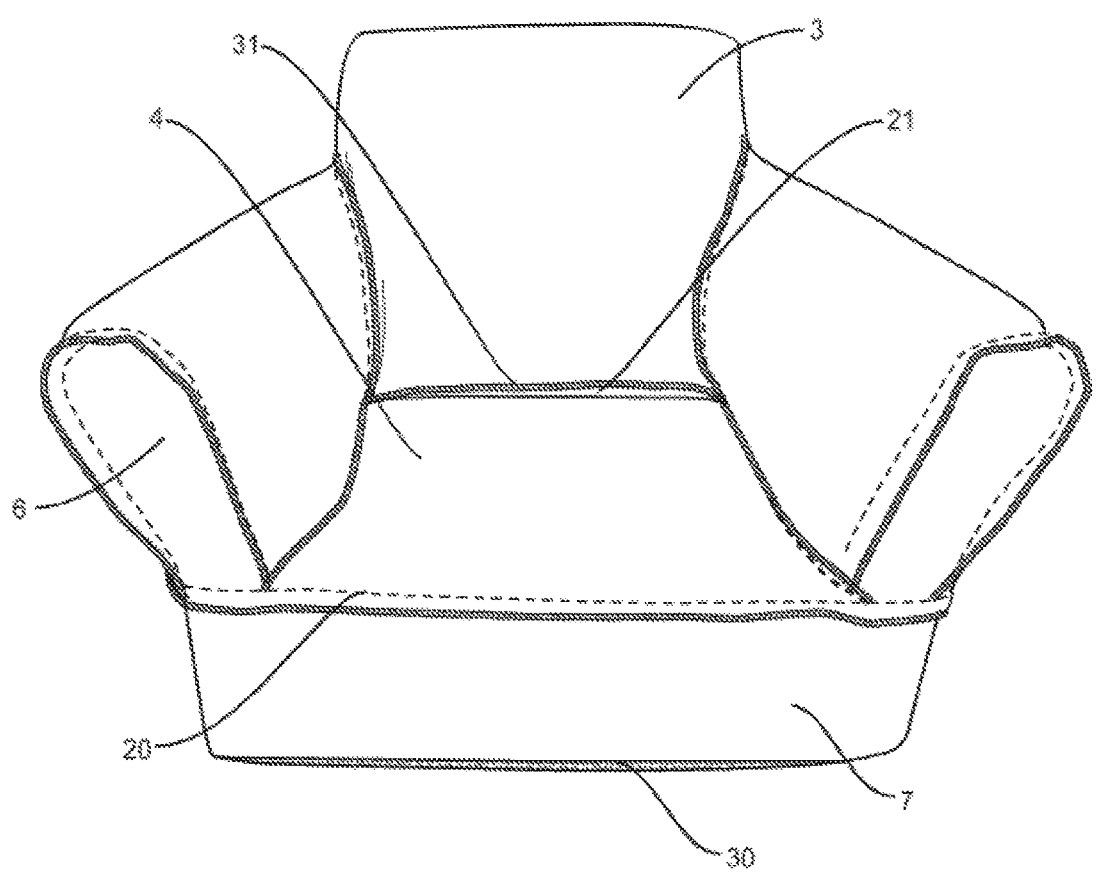
FIG. 5 is a front view of a slipcover positioned inside-out over a chair according to embodiments of the present disclosure.
Figure 6:
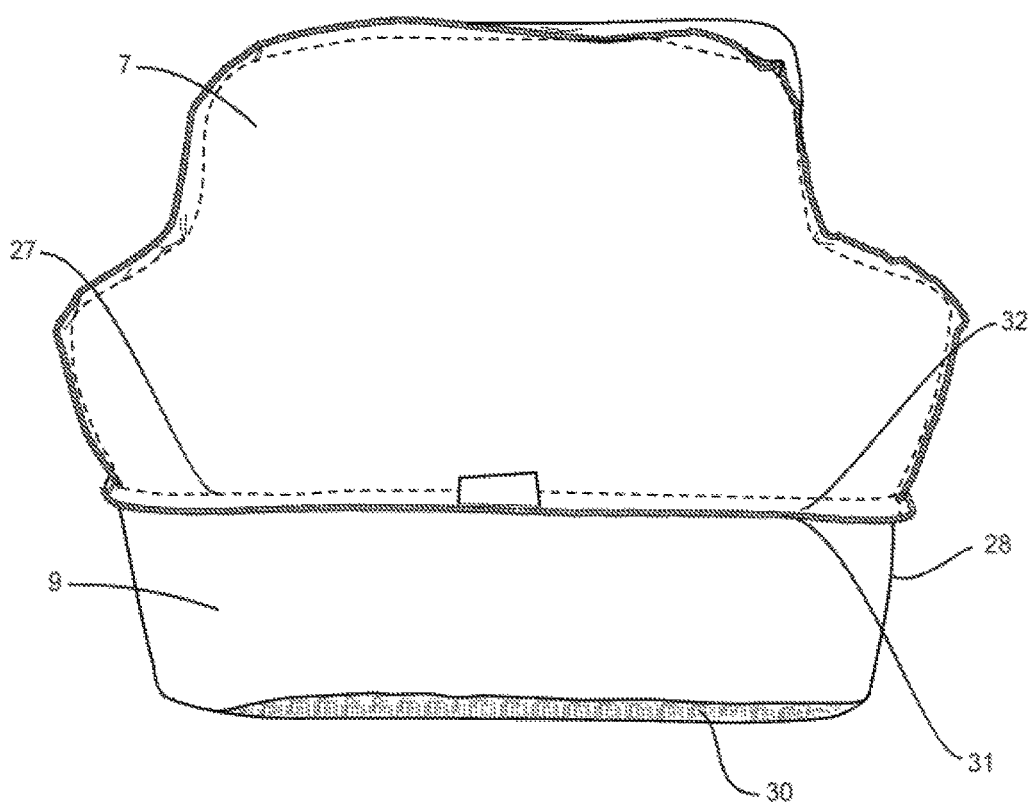
FIG. 6 is a rear view of a slipcover positioned inside-out over a chair according to embodiments of the present disclosure.

FIGS. 1-3 are an exterior perspective view, an exterior front view, and an exterior rear view of a slipcover 1 according to embodiments of the present disclosure. FIGS. 4-6 are an interior perspective view, an interior front view, and an interior rear view of the slipcover 1 respectively. In FIGS. 1-6, the slipcover 1 is shown as it may appear in-use over an underlying chair, e.g. with the exterior of the slipcover 1 visible. The slipcover 1 may be formed from a plurality of fabric panels 3-9. The plurality of fabric panels 3-9 may include a backrest panel 3, a seat panel 4, a pair of armrest panels 5, a pair of cap panels 6, a rear panel 7, a front skirt panel 8 and a rear skirt panel 9. As shown in FIGS. 1-6, each of the fabric panels 3-9 is named to provide a general correlation between each fabric panel 3-9 and the portion of a chair that a particular fabric panel 3-9 is expected to cover or protect.

The slipcover 1 of the present disclosure is not necessarily limited to only the fabric panels 3-9 described herein and shown in FIGS. 1-6. For example, a single panel in the illustrated embodiment may be constructed of two or more separate panels in another embodiment. The quantity, size and dimensions of the fabric panels 3-9 may also vary based upon the size, capacity, and design of the underlying furniture piece. The fabric panels 3-9 may be formed from a variety of fabrics to allow for slipcovers 1 to be created with a large assortment of colors, patterns, and textures. The fabrics may be woven or knit. The elongation of the fabric is not particularly limited. Fabrics may be used that have equal elongation in two direction or fabrics may have elongation in one direction greater than elongation in a perpendicular direction.

In some embodiments, the slipcovers 1 are free from pleats. In other words, the slipcovers 1 may fit over furniture without having extra fabric panels or pleats sewn into a fabric panel for the purpose of expanding during installation and removal of the slipcover 1. When the slipcover 1 is on a chair, substantially all of the fabric panels 3-9 are expected to be visible without significant overlap, with the exception of seam allowances and the like.

The plurality of fabric panels 3-9 are brought together at a plurality of sewn seams 20-28 as seen in FIGS. 1-6. The particular type of sewn seam is not particularly limited, but includes any stitch pattern that may provide a clean edge to prevent fraying as is known in the art, such as overlock and Hong Kong. In some instances, other substantially permanent seam types may be used, for example seams formed using adhesive or other laminating techniques. Each fabric panel 3-9 may be cut to a size and a shape such that when combined, the plurality of panels removably fit tightly over a chair. In some embodiments all of the seams will be substantially permanently formed or joined. In other words, the slipcover 1 can be applied to a chair as a pre-formed unit that does not require additional connections to be made between panels during or after installation of the slipcover 1 over the chair. In these embodiments, the slipcover 1 is free from ties, straps, snaps, buttons, zippers, or other fasteners that would releasably join or connect separate fabric panels or portions of a panel. Additionally, the slipcover 1 may provide a sufficiently snug fit over the chair that fastening features directly connecting the slipcover 1 to the chair may be carefully avoided.

As shown in FIG. 2, the seams 20-28 can include a front seat seam 20, a rear seat seam 21, and a pair of side seat seams 22 disposed adjacent to respective edges of the seat panel 4. The front seat seam 20 may join the seat panel 4 to the front skirt panel 8. Piping has been added to the front seat seam 20 in the illustrated embodiment. The rear seat seam 21 may join the seat panel 4 to the backrest panel 3. Each of the side seat seams 22 may join the sides of the seat panel 4 to respective armrest panels 5.

As shown in FIGS. 1 and 2, a top backrest seam 23, a pair of upright backrest seams 24, and the rear seat seam 21 may frame the backrest panel 3. In other words, the top backrest seam 23 may join the backrest panel 3 to the rear panel 7. In the illustrated embodiment, piping has been added along the top backrest seam 23 as best shown in FIG. 3. Each of the upright backrest seams 24 may join the backrest panel 3 to a respective armrest panel 5.

As shown in FIG. 2, each cap panel 6 may be at least partially surrounded by a cap seam 25. The cap seam 25 may join the cap panel 6 to the armrest panel 5. The cap seam 25 may be provided with piping. Each cap panel 6 may be further framed by a portion of the front seat seam 20 between the cap panel 6 and the front skirt panel 8.

As shown in FIG. 3, the rear panel 7 may join the backrest panel 3 along the top backrest seam 23. The rear panel 7 may form part of two rear arm seams 26 where the rear panel 7 joins the armrest panels 5. The rear arm seams 26 are shown with piping in the illustrated embodiment. The rear panel 7 may connect to the rear skirt panel 9 along a first skirt seam 27. Further, a pair of second skirt seams 28 may be sewn to attach the front skirt panel 8 to the rear skirt panel 9.

Figure 7:
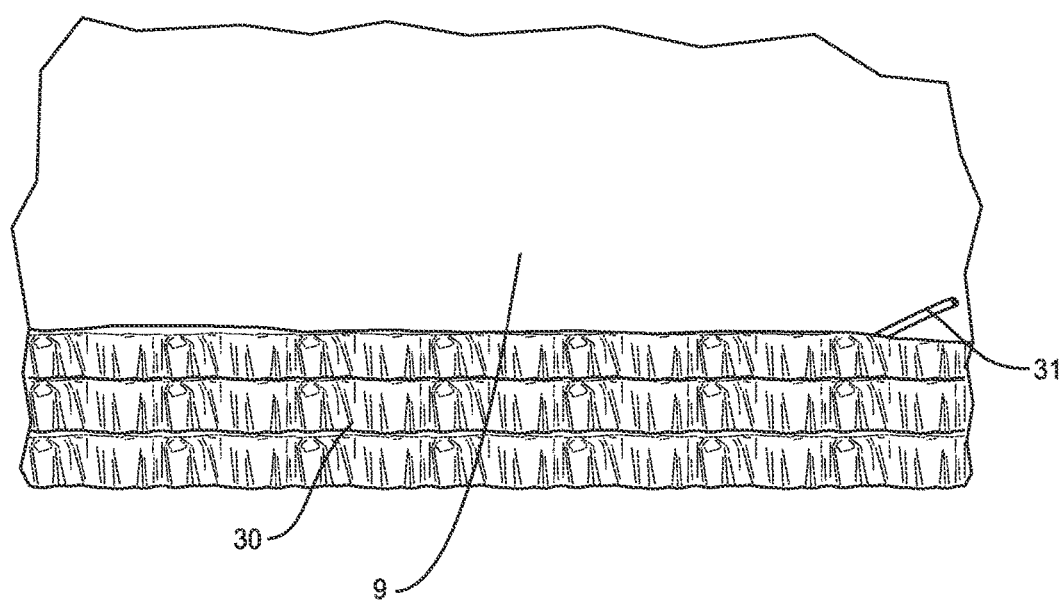
FIG. 7 is a rear detailed view of a hem of a slipcover positioned inside-out over a chair according to embodiments of the present disclosure.

A hem 30 may be provided around the bottom of the slipcover 1 to complete the distal bottom edges of the front and rear skirt panels 8, 9. A close up view of the hem 30 is shown in FIG. 7, as discussed below. The hem 30 may be sewn or constructed to provide the bottom opening of the slipcover 1 with stretch and recovery properties that are increased relative to the fabric of the panels alone. Therefore, the hem 30 may be described as having a low modulus of elasticity around the circumference of the hem 30 and a relatively high resilience or ability to return to a neutral circumference as compared to the fabric panels themselves. In one embodiment, a length of elastic material 31 (e.g. a braided elastic band or other elastic thread) may be incorporated into the hem 30 to increase the degree of relative stretch and recovery. If FIG. 7, a portion of an elastic thread, i.e. elastic material 31, is shown protruding from the hem 30. The elastic material may extend around the entire bottom opening. Having a bottom opening defined by the hem 30 that is constructed to allow for expansion improves the ability for the slipcover 1 to more easily fit over an underlying chair when the slipcover 1 is being added to or removed from the chair. The elastic material will help ensure stretch while placing the slipcover 1 on the chair, and a snug fit while on the chair.

As seen in FIG. 7, the hem 30 has a bunched appearance as fabric from the front and rear skirt panels 8, 9 is compressed together. It is noted that the bunched fabric is within the hem 30 itself, and the front and rear skirt panels 8, 9 form a relatively tightfitting, non-ruffled skirt around the chair. No pleats are added in the illustrated embodiment. The front and rear skirt panels 8, 9 are also preferably attached to one another along a height direction by the second skirt seams 28 to form a substantially continuous skirt around the chair. In other words, the resulting skirt does not have any slits that would create separate skirt flaps. In other words, the hem 30 may be continuous around a perimeter of the slipcover 1. The height of the skirt formed by at least the front and rear skirt panels 8,9 should be determined so that the skirt aligns with the bottom of the chair when in-use.

Figure 8:
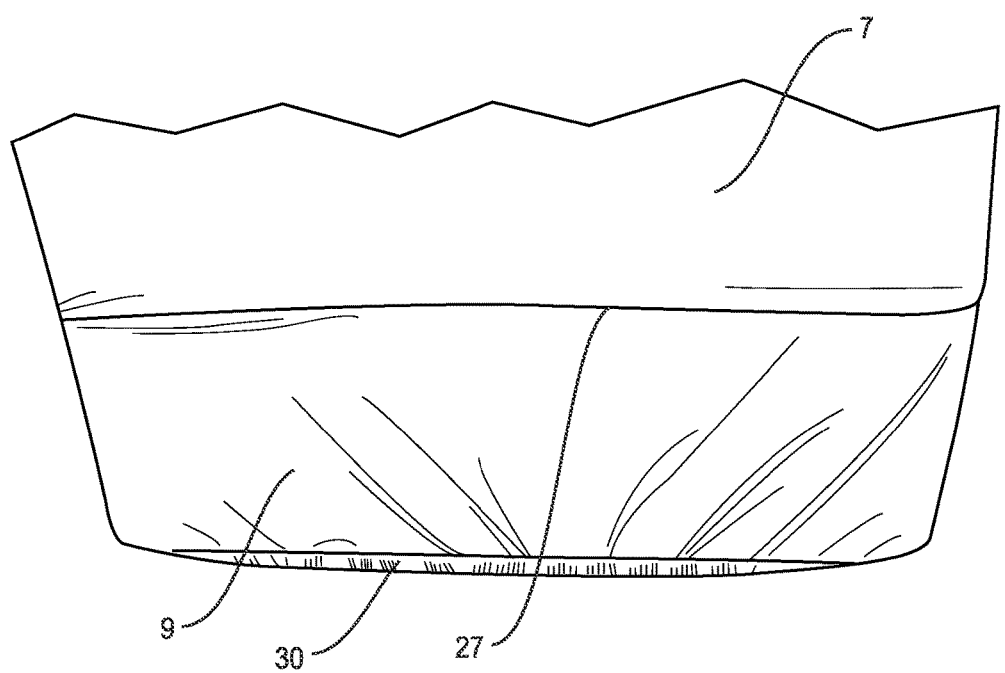
FIGS. 8 and 9 are a rear close-up view of a first skirt seam of a slipcover positioned over a chair according to embodiments of the present disclosure from an exterior and interview views respectively.
Figure 9:
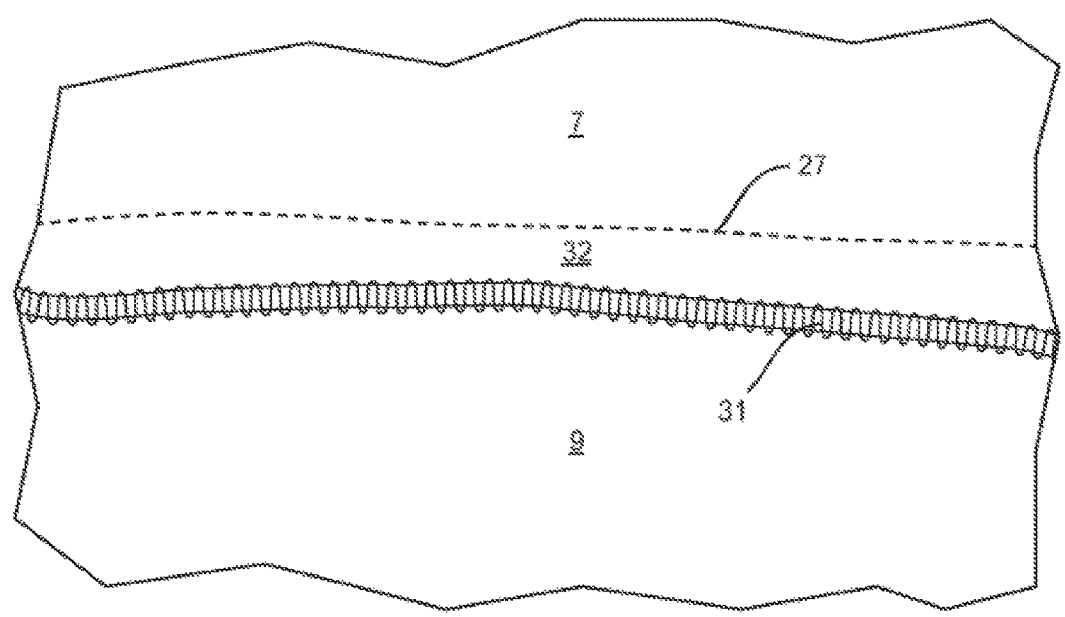

As seen in the exterior detailed view of FIG. 8, the first skirt seam 27 along the back of the slipcover 1 is constructed as a plain seam to be substantially hidden from view along the exterior of the slipcover 1. As seen in the interior view of FIG. 9, however, the first skirt seam 27 is provided with a seam allowance 32. The ends of the seam allowance 32 from each of the rear panel 7 and the rear skirt panel 9 may be bound together. An elastic band, such as braided elastic between about ¼-inch and about ¾-inch wide, or elastic yarns comprising rubber, or spandex, may be disposed within the seam allowance 32 of the first skirt seam 27. In one embodiment, incorporating a length of elastic material into the seam allowance 32 places the elastic at a location that is substantially inward of a plane formed by the rear panel 7 and the rear skirt panel 9. By locating the elastic material outside of this plane, the elastic material may be considered hidden from an exterior view of the slipcover 1. In contrast, elastic material disposed within a dedicated sleeve or between two fabric plies such that the elastic is substantially within the plane of the rear panel 7 and rear skirt panel 9 would produce a visible ruffling along the back of the slipcover along the predetermined seam.

With or without added elastic material, the stitch along the first skirt seam 27 may be selected to provide increased stretch along the length of the first skirt seam 27 relative to the elongation characteristics of the fabric itself. In other embodiments, the first skirt seam 27 may have a high degree of stretch relative to the front seat seam 20 as a result of piping 33 (see FIG. 2) included along the front seat seam 20 and intentionally omitted along the first skirt seam 27. When fitted over the chair, providing a relatively high degree of elasticity in a hidden manner along the first skirt seam 27 provides a clean appearance to the back of the covered chair. The high degree elasticity provides the desired well-tailored fit of the slipcover 1 over the underlying chair. Then, the high degree of elasticity allows the slipcover 1 to be more easily removed from the chair for cleaning or replacement.

Returning to FIG. 5, an interior, i.e. inside-out, view of the rear seat seam 21 is shown. The rear seat seam 21 may also be constructed to enhance the stretch and recovery along the rear seat seam 21 compared to the characteristics of the fabric alone. The rear seat seam's increased ability to stretch and recover may be a function of the stitch used along the rear seat seam 21, may be the result of a length of elastic material 31 added along the seam, such as within the seam addition, or a combination of the two.

As discussed above, slipcovers 1 of the present disclosure provide a tight fitting cover for a pleasing appearance by aesthetically and strategically adding elasticity, such as through the use of lengths of elastic material 31, to one or more seams of the slipcover 1, resulting in a cover that maintains the desired finished appearance with an improved ability to be slid on and off of an underlying seat. The slipcovers 1 of the present disclosure may be installed without additional forms of attachment directly to the seat and without additional steps of connecting separate sections of the slipcovers.

An embodiment of the present disclosure may be understood based on the following paragraph:

Paragraph A: A slipcover with enhanced removability, comprising:

a first fabric panel sized and dimensioned to correspond with a rear portion of a chair;

a second fabric panel sized and dimensioned to correspond with a backrest portion of the chair;

a third fabric panel sized and dimensioned to correspond with a seat portion of the chair; and at least one skirt fabric panel disposed below at least the first fabric panel, wherein a first seam between the first fabric panel and the at least one skirt fabric panel has a first degree of stretch, wherein a second seam between the second fabric panel and the third fabric panel has a second degree of stretch, wherein a third seam between the second fabric panel and the first fabric panel has a third degree of stretch, and wherein the first degree of stretch is greater than the third degree of stretch.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A slipcover comprising:
   a plurality of fabric panels, the fabric panels are sewn together to form a plurality of seams between adjacent panels and a continuous bottom hem; and
   at least one length of elastic material added along the continuous bottom hem or at least one of the seams to allow the slipcover to fit over a seat,
   wherein the slipcover is free from pleats,
   wherein the slipcover is not fastened directly to the seat when in-use,
   wherein the plurality of sewn seams are the only form of attachment between separate panels of the plurality of fabric panels when the slipcover is installed on the seat,
   wherein a length of elastic material is included in at least one of the seams, wherein a first length of elastic material is included in a seam between a rear panel and a skirt panel, and
   wherein a second length of elastic material is included in a seam between a back panel and a seat panel.

2. The slipcover according to claim 1, wherein at least one of the at least one length of elastic material is hidden from view when the slipcover is in-use upon the seat.

3. The slipcover according to claim 1, wherein: a length of elastic material is included substantially continuously along the continuous bottom hem.

* * * * *